United States Patent [19]

Domigan

[11] Patent Number: 4,745,717
[45] Date of Patent: May 24, 1988

[54] ADAPTOR FOR POKE-THRUS

[75] Inventor: Charles N. Domigan, Coolville, Ohio

[73] Assignee: Butler Manufacturing Company, Kansas City, Mo.

[21] Appl. No.: 943,711

[22] Filed: Dec. 19, 1986

[51] Int. Cl.⁴ ............................................. E04B 5/48
[52] U.S. Cl. ....................................... 52/221; 174/48; 248/357; 52/730; 52/738
[58] Field of Search .............. 52/221, 287, 737, 738, 52/301, 287, 730; 211/26; 248/357; 138/114; 339/125 R, 126 R; 174/48

[56] References Cited

U.S. PATENT DOCUMENTS

| | | | |
|---|---|---|---|
| 1,483,453 | 2/1924 | Knoderer | 220/3.94 |
| 1,734,543 | 11/1929 | Thomas | 220/3.92 |
| 2,882,564 | 4/1959 | Couse et al. | 52/287 |
| 3,918,224 | 11/1975 | Sundequist | 174/48 |
| 4,015,397 | 4/1977 | Flachbarth et al. | 52/221 |
| 4,573,297 | 3/1986 | Benscoter et al. | 52/221 |

FOREIGN PATENT DOCUMENTS 249972 10/1964 Austria ................................. 52/738

Primary Examiner—James L. Ridgill, Jr.
Attorney, Agent, or Firm—Frederick J. Olsson

[57] ABSTRACT

An adaptor to interface a poke-thru with power cable sets of a flexible wiring system. The adaptor has: an elongated, hollow housing with an axially extending opening; a support inside of the housing having a center section and a head, the center section extending across the opening and the head which has an opening for power conductors extends across the interior of the housing; a wire connector mounted on the center section of the support member and accesible through the housing opening; and a hollow, axially extending barrier inside of the housing and resting the head, the interior of the barrier being in communication with power conductor passageway in the head. The portion of the housing not closed off by the center section serves as an entrance to the adaptor for communication cables. The barrier and the head isolate the communication cables from the power conductors.

2 Claims, 2 Drawing Sheets

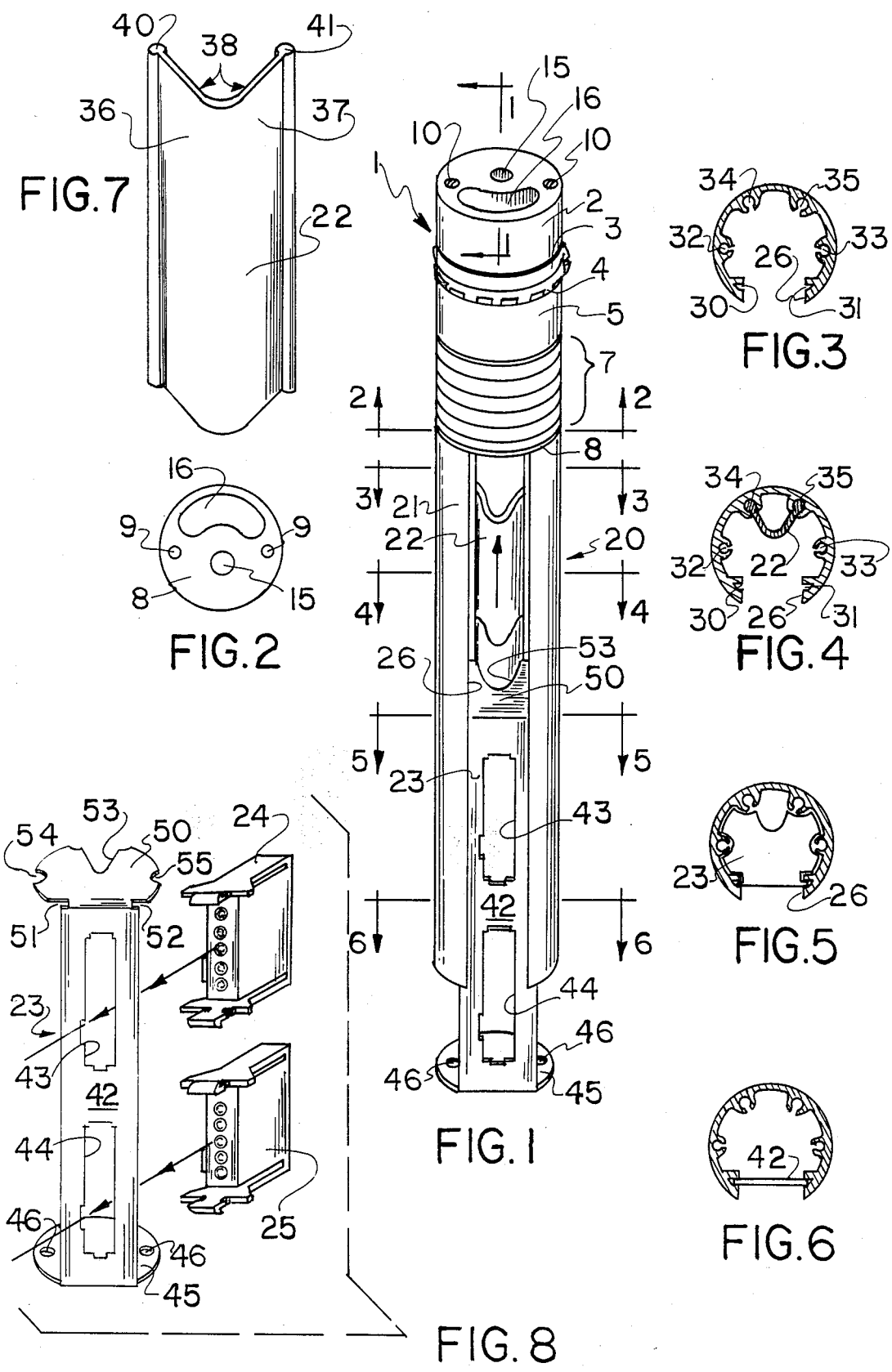

ADAPTOR FOR POKE-THRUS

This invention relates in general to poke-thrus for electrical in-floor power and communication distribution systems in buildings having floors formed in whole or in part by concrete with a suspended ceiling below the floor, the space between the floor and ceiling having a flexible wiring system for power distribution and various cables for communication distribution.

Poke-thrus of the kind in question normally comprise an above-the-floor service or floor fitting or a flush service or floor fitting mounted on the building floor and a thru-floor unit mounted in a bore in the floor. The floor fitting provides power and/or communication service at a work station on the floor surface and the thru-floor unit carries power and/or communication conductors from underneath the floor to the floor fitting.

More specifically, the invention relates to an adaptor to interface a poke-thru with the power cable sets of the flexible wiring system and also to provide for entry of communication cables into the poke-thru.

The invention will be described below in connection with the following drawings wherein:

FIG. 1 is a perspective view of a thru-floor unit of a poke-thru having the adaptor of the invention secured thereto with certain components of the adaptor slightly shifted from their normal positions;

FIG. 2 a view taken along the lines 2—2 of FIG. 1;

FIG. 3 is a view taken along the lines 3—3 of FIG. 1;

FIG. 4 is a view taken along the lines 4—4 of FIG. 1;

FIG. 5 is a view taken along the lines 5—5 of FIG. 1;

FIG. 6 is a view taken along the lines 6—6 of FIG. 1;

FIG. 7 is a perspective view of a barrier used in the adaptor of FIG. 1;

FIG. 8 is an exploded view showing a support and wire connectors used in the adaptor of FIG. 1;

Figure 9:
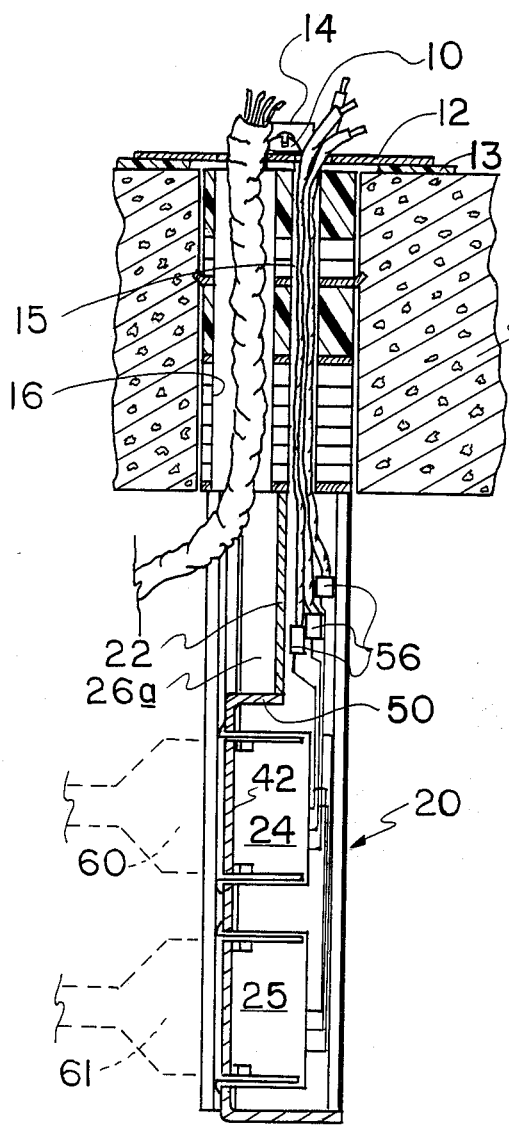
FIG. 9 is a sectional view taken long the lines 7—7 of FIG. 1 (with the components in normal position) but with the unit mounted in a floor and having power conductors and communication cables extending up through the unit and through a floor fitting base.

The pole-thru floor unit illustrated herein is the type shown in U.S. Pat. No. 4,573,297 assigned to the assignee of this invention. As noted in said patent, the floor fitting unit is the above-the-floor or tombstone type.

Referring to FIG. 1, the thru-floor unit 1 includes top spacer means 2, top fire-stop means 3, retaining clip 4, bottom spacer means 5, top retainer 6, bottom fire-stop means 7, and bottom retainer 8. A pair of screws 10 extend through the above mentioned parts and are threaded through clearance holes 9 in bottom retainer 8 and thence into the adaptor as will be noted later.

Figure 10:
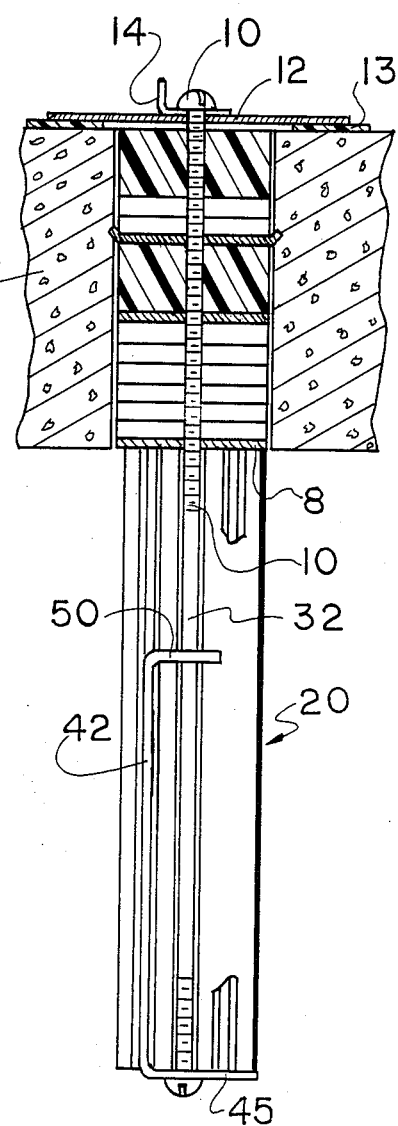
FIG. 10 is a sectional view similar to FIG. 9 but with certain parts removed.

As shown in more detail in said patent, the thru-floor unit is connected to the floor fitting via the screws 10. This is indicated in FIGS. 9 and 10 where the thru-floor unit 1 is mounted in a bore of the floor 11. The base 12 and gasket 13 of the floor fitting are on the floor surface. The heads of screws 10 engage divider feet 14 and are threaded into the bottom retainer 8 to hold the thru-floor and floor fitting together.

The above components have axially aligned openings for passage of the power and communication cables. In FIGS. 1 and 2 the power passageway is noted at 15 and the communication passageway is indicated at 16.

While not shown in FIGS. 9 and 10, the base plate 12 and the retainer clip are physically held apart in fixed relationship by tubular separators connected between these components. Likewise, the top and bottom retainers are physically held apart in fixed relationship by tubular separators.

The base 12, gasket 14, and divider feet 14 are components of an above-the-floor or tombstone type floor fitting. As the description proceeds, it will be evident that the adaptor can be coupled to a thru-floor unit serving a recessed or flush-type floor fitting.

I will now describe the structure of the interfacing adaptor 20.

The adaptor includes an elongated hollow extrusion or housing 21, a barrier 22 which is also an extruded part, a support 23 which is a stamped part and wire connectors 24 and 25 which are of conventional design. The barrier, the support, and wire connectors fit inside of the extrusion 20, the inside of which is configured so the barrier and support can slide into position.

The housing or extrusion 20 is cut to length from an extruded blank of the same cross section. The material preferable is an aluminum alloy. The extrusion has an axially extending opening 26 through which the plug-in cable heads of a cable set and communication cable enter the adaptor (see FIG. 9).

The inside of the extrusion has a special configuration to mount the barrier 22 and the support 23 with its wire connectors as will now be described particularly with respect to FIG. 3.

Adjacent the opening 26 are a pair of slots 30 and 31 which face one another and extend throughout the length of the extrusion. Each slot has generally parallel sides. This configuration is to accept the support 23. Centrally of the extrusion 21 are a pair of slots 32 and 33 which face one another and extend throughout the length of the extrusion. The slots 32 and 33 are round in configuration for purposes of accepting self-tapping screws.

Opposite the opening 26 are a pair of slots 34 and 35 which extend throughout the length of the extrusion and face inwardly toward the center. The purpose of the slots 7 is to accept the barrier 22.

I will now describe the structure of the barrier 22 particularly with reference to FIG. 7.

The barrier 22 is cut to length from an extruded part of the same cross section. The material is an alluminun alloy. The barrier 28 is formed with a bend substantially at the midsection which creates a pair of legs 36 and 37. At the end of each leg are circular thickened sections or feet 40 and 41. The space 38 between the legs 36 and 37 functions as a passageway for power conductors.

I will now describe the support 23 and its wire connectors 24 and 25 particularly in connection with FIG. 8.

The support has a flat, elongated center section 42 having apertures 43 and 44 for mounting the wire connectors 24 and 25. A foot 45 at the lower end of the center section 42 is bent outwardly at a right angle and has clearance holes 46. The periphery is circular and has the same outside diameter as the extrusion 21. A head 50 at the top end of the center section 42 is bent outwardly at a right angle. Between the head 50 and center section 42 are rectangular cut-outs 51 and 52. These cutouts permit the opposite edges of the center section 42 to slide into the slots 30 and 31 in the extrusion 21. On the opposite side, the head 50 has an inwardly cutout extending V-shaped section 53 which is configured similarly as the space 38 in the barrier 22 and serves as a passageway for power conductors. The head 50 also has cut outs 54 and 55 which provide clearance for the material forming the slots 32 and 33. The portions of the head between the adjacent cutouts each have a peripheral configuration to provide for the support to be slidable in the extrusion 21.

The wire connectors 24 and 25 are conventional-type items. The external shape of the connectors and the shape of the apertures 43 and 44 being coordinated so that the connectors can be snapped in place.

The manner in which the adaptor 20 is connected to the thru-floor unit 1 and the assembly of the barrier 22 and support 23 will now be described.

The floor fitting and the thru-floor unit 1 are assembled as described in said patent. The screws 10 are longer than the corresponding screws shown in said patent whereby the lower ends of the screws will extend down beyond the clearance holes 9 in the bottom retainer 8. During the assembly, the extrusion 21 is positioned adjacent the bottom of the thru-floor unit 1 so that the screws 10 and the slots 32 and 33 are in alignment. By turning the screws, the same will be threaded in the slots 32 and 33 and the thru-floor unit 1 and extrusion 21 secured together. The assembly which will include the floor fitting base and gasket 12 and 13, the thru-floor unit 1, and the extrusion 21 are pushed down through the bore in the cement floor as shown in FIGS. 9 and 10.

Next the wire connectors 24 and 25 with their respective conductors are assembled to the support 23. The assembly is then positioned so that the conductors can be pushed up through the extrusion 20 and up through the power passageway at as noted in FIG. 9. Normally, the conductors from a wire connector will be spliced onto other conductors for extending up through the unit. See the wire splices 56 in FIG. 9.

The barrier 22 is then positioned over the conductors with the feet 40 and 41 aligned with the slots 34 and 35. Next the support 23 is aligned with the lower end of the extrusion 21 so that the edges of the center section 42 are lined up with slots 30 and 21 and the head 50 abuts the lower end of the barrier 22.

The support 23 is pushed inwardly until the head 45 engages the lower end of the extrusion 21. Screws are then put through the clearance apertures 46 and threaded into the slots 32 and 33.

The plug-in cable heads of the flexible wiring system can be plugged into the wire connectors 24 and 25 as indicated by dotted lines 60 and 61 in FIG. 9.

As will be evident, the center section 42 of the support 23 partially closes off the opening 26. This leaves a section 26a open through which communication cable can enter the adaptor as shown in FIG. 9.

The power conductor and the wire connectors are isolated from the communications conductor by the head 50 of the support and the barrier 22.

I claim:

1. An adaptor to interface a poke-thru with power cable sets of a flexible wiring system;

an elongated, hollow housing having an opening extending throughout the length of the housing;

A support member mounted inside of said hollow housing, the support member having a center section extending across said opening and partially along the length thereof and also having a head which extends across the interior of the housing in close association with the wall of same, the head including a passageway for said power conductors;

wire connector means including power conductors mounted on the center section of said support member and accessible through said opening;

a hollow barrier inside of said housing and engaging said head, the interior of the barrier being in communication with said power conductor passageway in said head and the barrier also serving as a passageway for power conductors; and the portion of said opening not closed off by said center section serving as an entrance to the adaptor for commucication cables and said barrier and said head isolating the communication cables from said power conductors.

2. An adaptor to interface a poke-thru with power cable sets of a flexible wiring system:

an elongated hollow, cylindrical housing having an opening extending throughout the length of the housing:

first means forming a first pair of slots disposed inside of the housing and facing one another respectively adjacent the opposite edges of said opening and being for use in slidingly receiving the flat body of a closure member;

second means forming a second pair of slots disposed inside of the housing and facing one another along a diameter of the housing and extending throughout the length of the housing, the portion of the second pair of slots at one end of the housing being for use in receiving screw means for securing the adaptor to the thru-floor unit of a poke-thru and the portion of the second pair of slots at the opposite end of the housing being for use in receiving screw means for securing a foot of a closure member;

third means forming a third pair of slots disposed inside of the housing opposite said opening and facing one another and extending throughout the length of the housing and being for use in slidingly receiving a barrier means for use in isolating power conductors;

a flat, elongated body having at least one aperture, the body being mounted in said first pair of slots and extending partially along the length thereof and partially covering the opening in said housing and having an aperture aligned with the housing opening for receiving a wire connector, the portion of the housing opening not covered by the body providing a passageway for communication cables to enter said housing;

a cylindrically shaped head at one end of the body and oriented at right angles thereto;

the head being formed with: (a) a V-shaped groove which faces the area inside of the housing which is between the means forming said third pair of slots; (b) portions which respectively extend into the areas between the means forming the first and the second pairs of slots; (c) portions which respectively extend into the areas between the means forming the second and third pairs of slots; and (d) a pair of clearance cut-outs respectively adjacent opposite edges of said body and respectively receiving portions of said first means;

a cylindrically shaped foot on the opposite end of the body and oriented at right angles thereto and engaging one end of the housing and closing off the same and having clearance apertures open to said second pair of slots;

the inside of said housing, said flat elongated body, said head, and said foot forming a chamber to receive wire connectors and power conductors;

said V-shaped groove, the means forming the third pair of slots, and the inside of the housing forming a passageway for power conductors out of said chamber; and an elongated barrier disposed inside of the housing opposite said portion of the housing not covered by said body and one end of the barrier engaging said head, the barrier being bent substantially at its midsection to form a pasageway for power conductors and being in communication with first said passageway and the barrier having edges respectively disposed in said third pair of slots.

* * * * *